United States Patent [19]

Nakamura

[11] Patent Number: 4,850,936
[45] Date of Patent: Jul. 25, 1989

[54] TRANSMISSION RATIO CONTROL SYSTEM FOR A CONTINUOUSLY VARIABLE TRANSMISSION

[75] Inventor: Susumu Nakamura, Tokyo, Japan

[73] Assignee: Fuji Jukogyo Kabushiki Kaisha, Tokyo, Japan

[21] Appl. No.: 182,979

[22] Filed: Apr. 18, 1988

[30] Foreign Application Priority Data

Apr. 24, 1987 [JP] Japan ............................ 62-101491

[51] Int. Cl.⁴ ............................................. F16H 11/02
[52] U.S. Cl. ...................................... 474/28; 74/867
[58] Field of Search .................... 474/11, 12, 17, 18, 474/28, 69, 70; 74/861, 865, 867–869

[56] References Cited

U.S. PATENT DOCUMENTS

| | | |
|---|---|---|
| 4,627,313 | 12/1986 | Sakai ........................................ 74/867 |
| 4,628,773 | 12/1986 | Itoh et al. ........................ 474/28 X |
| 4,669,336 | 6/1987 | Okada et al. ........................... 74/867 |

*Primary Examiner*—Thuy M. Bui

*Attorney, Agent, or Firm*—Martin A. Farber

[57] ABSTRACT

A continuously variable transmission has a drive pulley having a hydraulically shiftable disc and a hydraulic cylinder for operating the disc, a driven pulley having a hydraulically shiftable disc and a hydraulic cylinder for operating the disc, and a belt engaged with both pulleys. The system has a hydraulic circuit having a pump for supplying oil to both the hydraulic cylinders and a drain passage for draining oil in the hydraulic cylinder of the drive pulley, and a transmission ratio control valve having a spool for controlling the oil supplied to the cylinder of the drive pulley and the oil drained from the cylinder to change the transmission ratio. A cam is provided for shifting the spool of the transmission ratio control valve in accordance with depression of an accelerator pedal of a vehicle, and a variable orifice is provided in the drain passage for controlling flow rate of drain oil from the cylinder of the drive pulley. The orifice is arranged to reduce the flow rate of drain oil when the magnitude of the depression of the accelerator pedal is large.

9 Claims, 9 Drawing Sheets

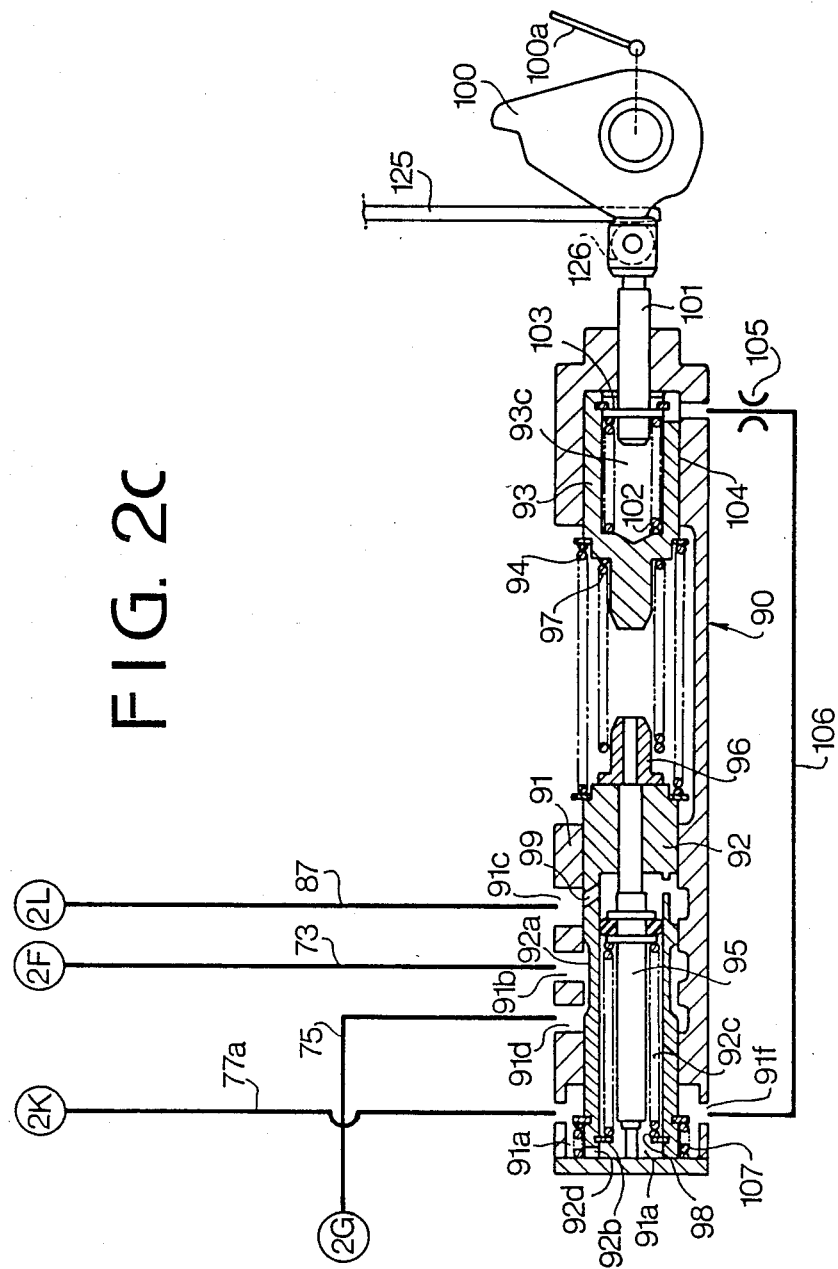

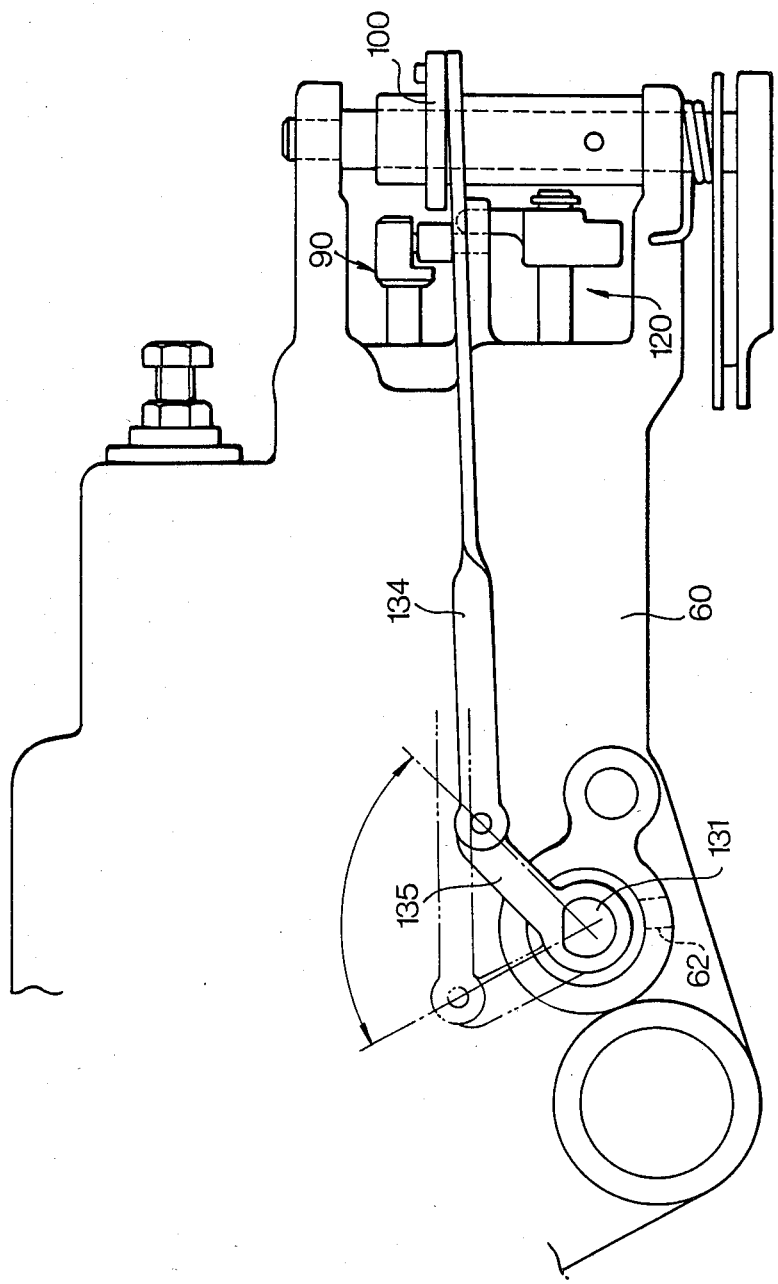

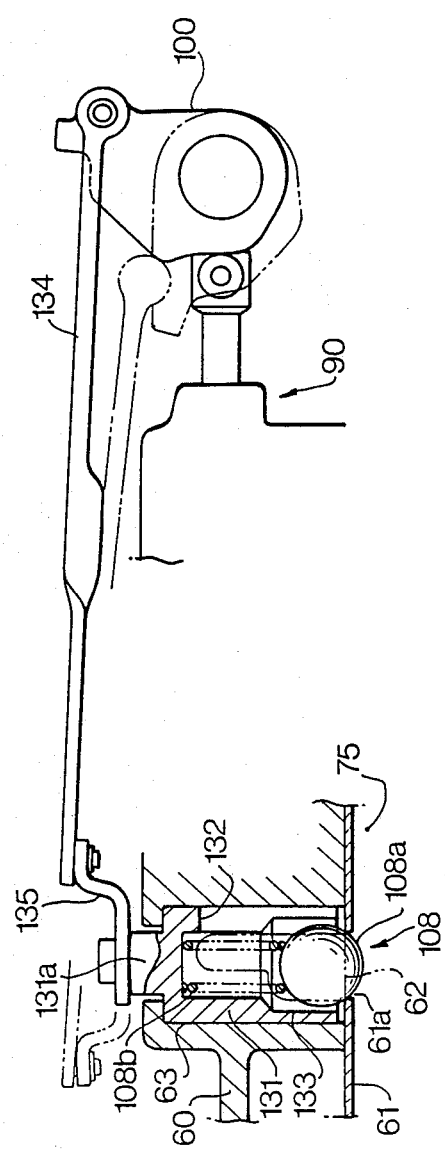
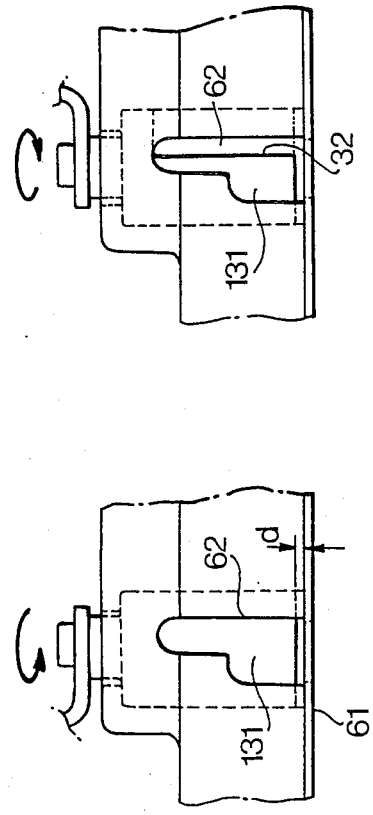

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio changing speed rate at downshifting for rapid acceleration, such as kickdown and at deceleration of the motor vehicle.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ration control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed rate which is decided by line pressure, pressure of oil supplied to the servo device of the drive pulley, and the actual transmission ratio.

The pressure applied to the servo device of the drive pulley is increased for upshifting the transmission and decreased for downshifting. Thus, the transmission ratio changing speed rate can be changed by controlling the amount of oil drained from the servo device.

The transmission is generally downshifted at deceleration of the vehicle at braking. In order to prevent the belt from slipping on the pulleys at reacceleration, it is necessary to quickly raise the line pressure while quickly downshifting the transmission to a small pulley ratio stage. To meet such requirements, the transmission ratio control valve is adapted to quickly drain the oil.

On the other hand, the transmission is also downshifted at kickdown. However, if the transmission ratio changing speed rate is as fast as during the above described deceleration, transmission shock occurs, thereby causing unpleasant driving. Therefore, it is preferable to speed up the downshift at deceleration and to slow down the downshift at kickdown.

Japanese Patent Laid Open No. 59-159456 (U.S. Pat. No. 4,565,110) discloses a transmission ratio control system wherein a shift direction changing valve and a shift speed control valve, each having a solenoid operated valve, are provided. Both the valves control the direction of the shifting of the transmission and the shifting speed rate thereof, respectively.

However, in such a system, the valves must be independently provided. Thus, the number of valves increases, resulting in a complicated system. Furthermore, since the shift speed control valve is provided to control the transmission ratio changing speed rate during upshift or downshift, the system cannot control the transmission ratio changing speed rate at kickdown.

SUMMARY OF THE INVENTION

The object of the present invention is to provide a system for controlling the transmission ratio where optimum downshift speed may be obtained at deceleration of the vehicle and at kickdown.

According to the present invention, there is provided a system for a continuously variable transmission having a drive pulley having a hydraulically shiftable disc and a hydraulic cylinder for operating the disc, a driven pulley having a hydraulically shiftable disc and a hydraulic cylinder for operating the disc, and a belt engaged with both pulleys. The system has a hydraulic circuit having a pump for supplying oil to both the hydraulic cylinders and a drain passage for draining oil in the hydraulic cylinder of the drive pulley, a transmission ratio control valve having a spool for controlling the oil supplied to the cylinder of the drive pulley and the oil drained from the cylinder to change the transmission ratio.

In accordance with the present invention, the system has means for shifting the spool of the transmission ratio control valve in accordance with depression of an accelerator pedal of the vehicle, and valve means provided in the drain passage for controlling flow rate of drain oil from the cylinder of the drive pulley. The valve means is arranged to change the flow rate of drain oil in accordance with magnitude of the depression of the accelerator pedal, so as to provide an optimum rate of downshifting at deceleration of the vehicle and at kickdown of the transmission respectively.

In an aspect of the invention, the means is a cam operatively connected with the spool and the accelerator pedal and operatively connected to the valve means. The valve means is arranged to reduce the flow rate of drain oil when the magnitude of the depression of the accelerator pedal is large.

The other objects and features of this invention will become understood from the following description with reference to the accompanying drawings.

BRIEF DESCRIPTION OF DRAWINGS

FIGS. 2a to 2c show a hydraulic control circuit according to the present invention;

FIGS. 3a and 3b are a plan view and a fragmentary sectional side view of a variable orifice, respectively;

FIGS. 3c and 3d show the variable orifice at opened state and at closed state, respectively;

DETAILED DESCRIPTION OF THE PREFERRED EMBODIMENTS

Figure 1A:
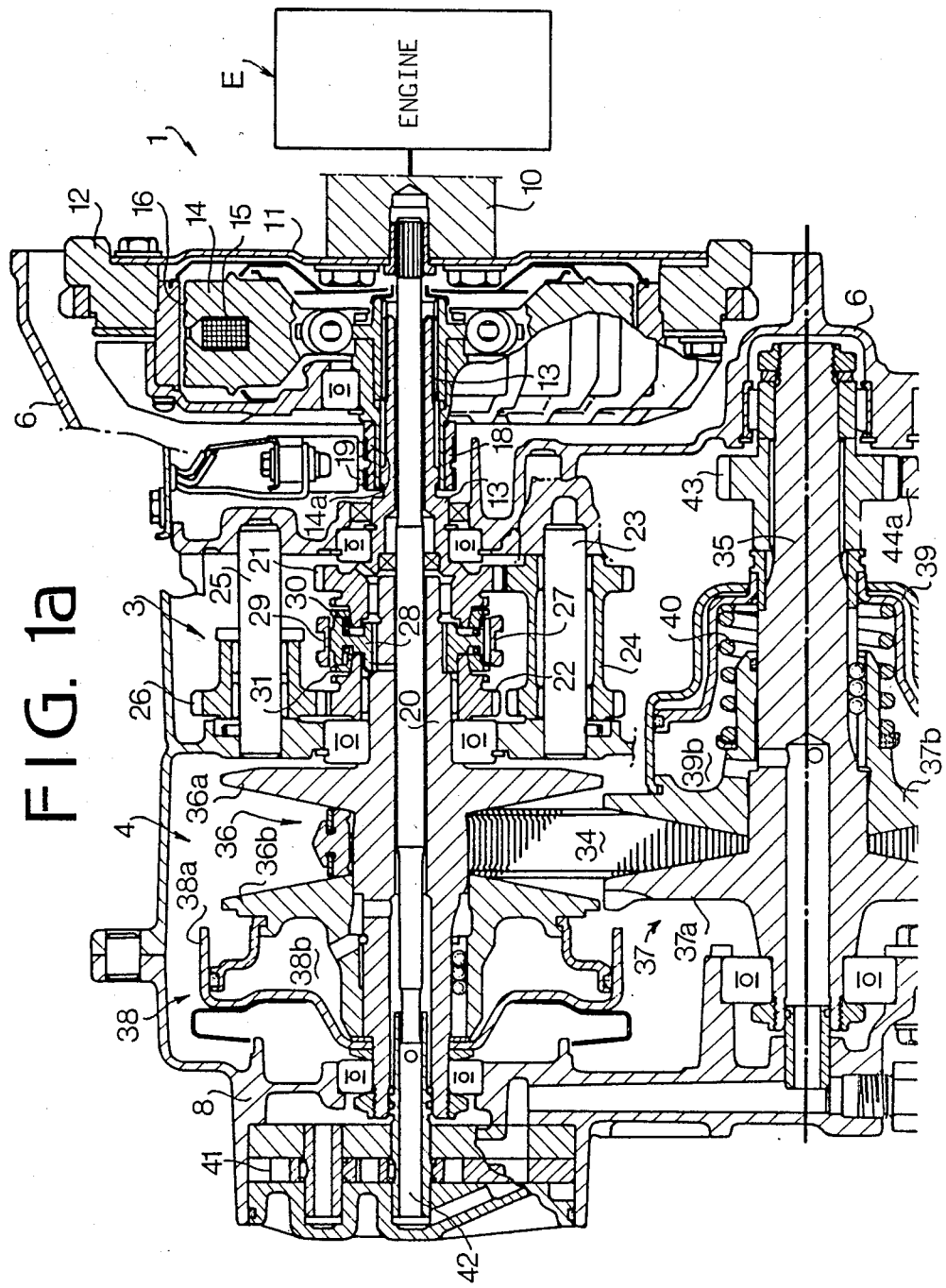
FIGS. 1a and 1b show a sectional view of a continuously variable belt-drive transmission to which the present invention is applied.
Figure 1B:
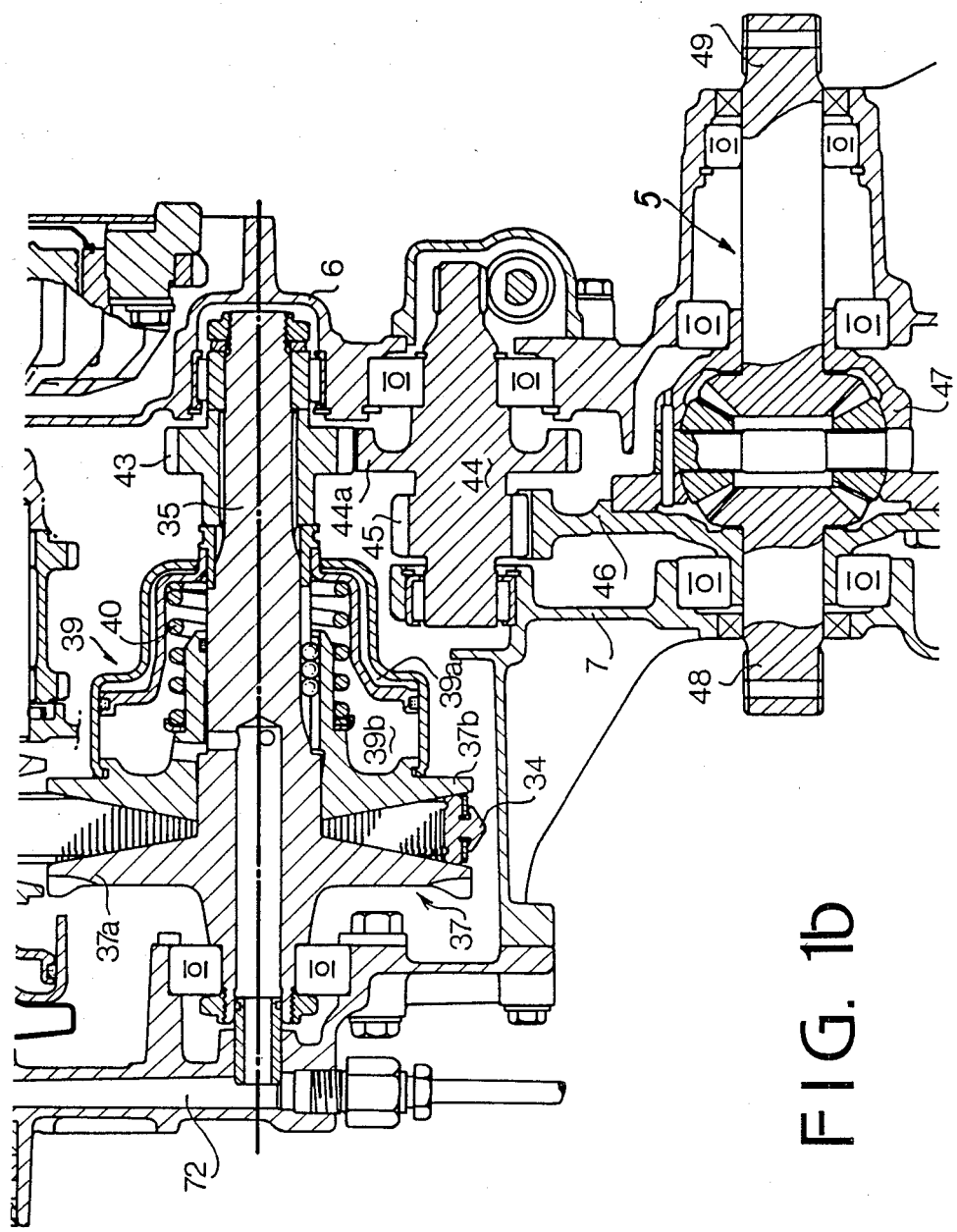

FIGS. 1a and 1b show a power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 3, an infinitely variable belt-drive transmission 4, and a final reduction device 5 for front wheels of the vehicle. The electromagnetic powder clutch 1 is provided in a housing 6. The selector device 3, transmission 4 and final reduction device 5 are provided in a main housing 7 and a side housing 8. A crankshaft 10 of the engine E is connected to an annular drive member 12 through a drive plate 11 of the electromagnetic powder clutch 1. The electromagnetic powder clutch 1 comprises a driven member 14, and a magnetizing coil 15 provided in the driven member 14. The driven member 14 has its outer periphery spaced from the inner periphery of the drive member 12 by a gap 16. Magnetic powder material is provided in the gap 16. The driven member 14 is secured to an input shaft 13 of the belt-drive transmission 4. A holder 14a secured to the driven member 14 carries slip rings 18 which are electrically connected to the coil 15. The coil 15 is supplied through brushes 19 and slip rings 18 with current from a control circuit for the electromagnetic powder clutch 1.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) or a parking position (P range) of a selector lever 114 (FIG. 2b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D, DS ranges). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. In the transmission 4, an output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the output shaft 35 opposite disc 36a. Movable conical disc 37b also slides in a cylinder 39a secured to the output shaft 35 to form a servo device 39. A chamber 39b of the servo device 39 is communicated with an oil pump 41 through a passage 72. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the intermediate shaft 44 engages with a final gear 46. Rotation of the final gear 46 is transmitted to axles 48 and 49 of front driving wheels of the vehicle through a differential 47.

Figure 2A:
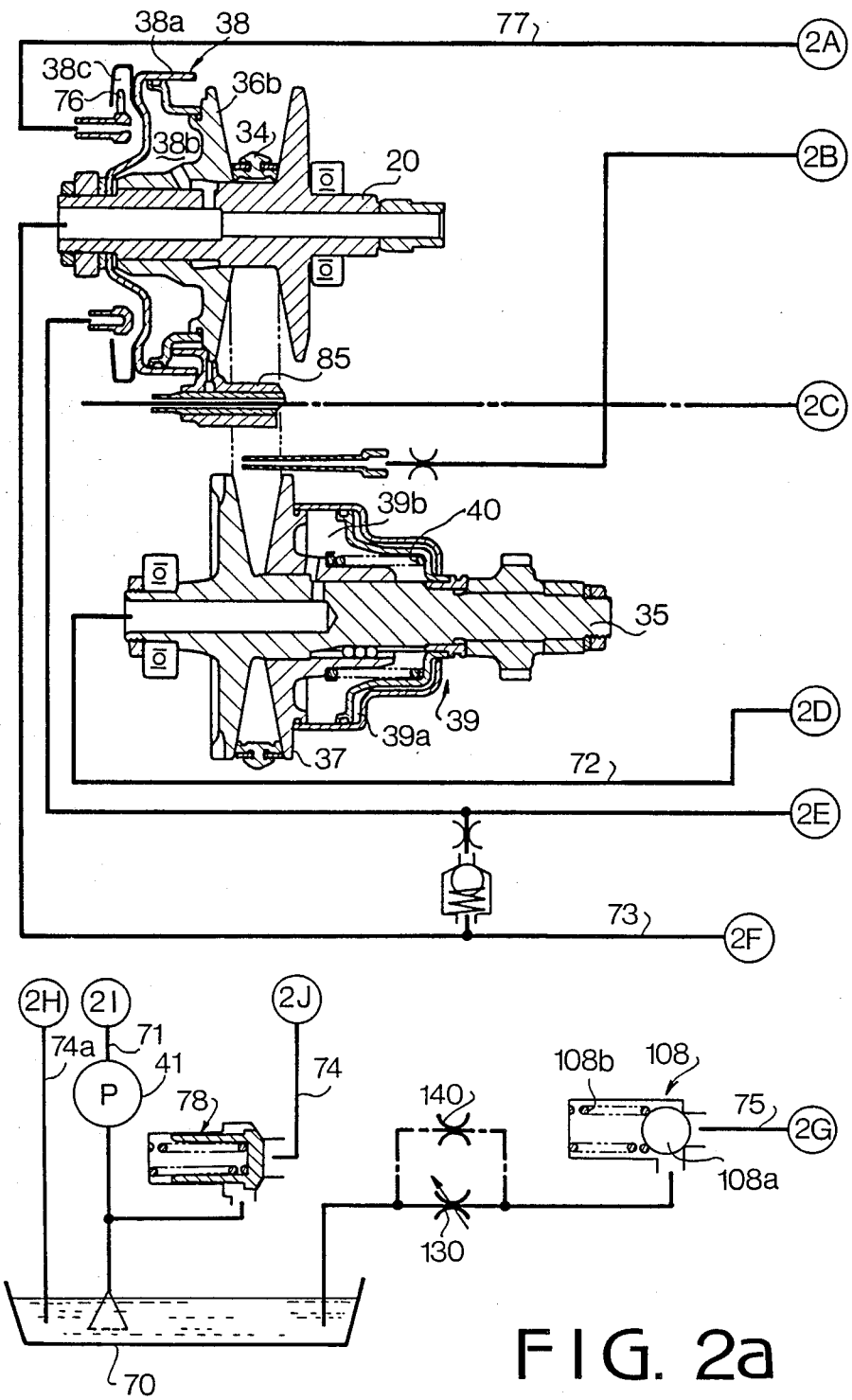
Figure 2B:
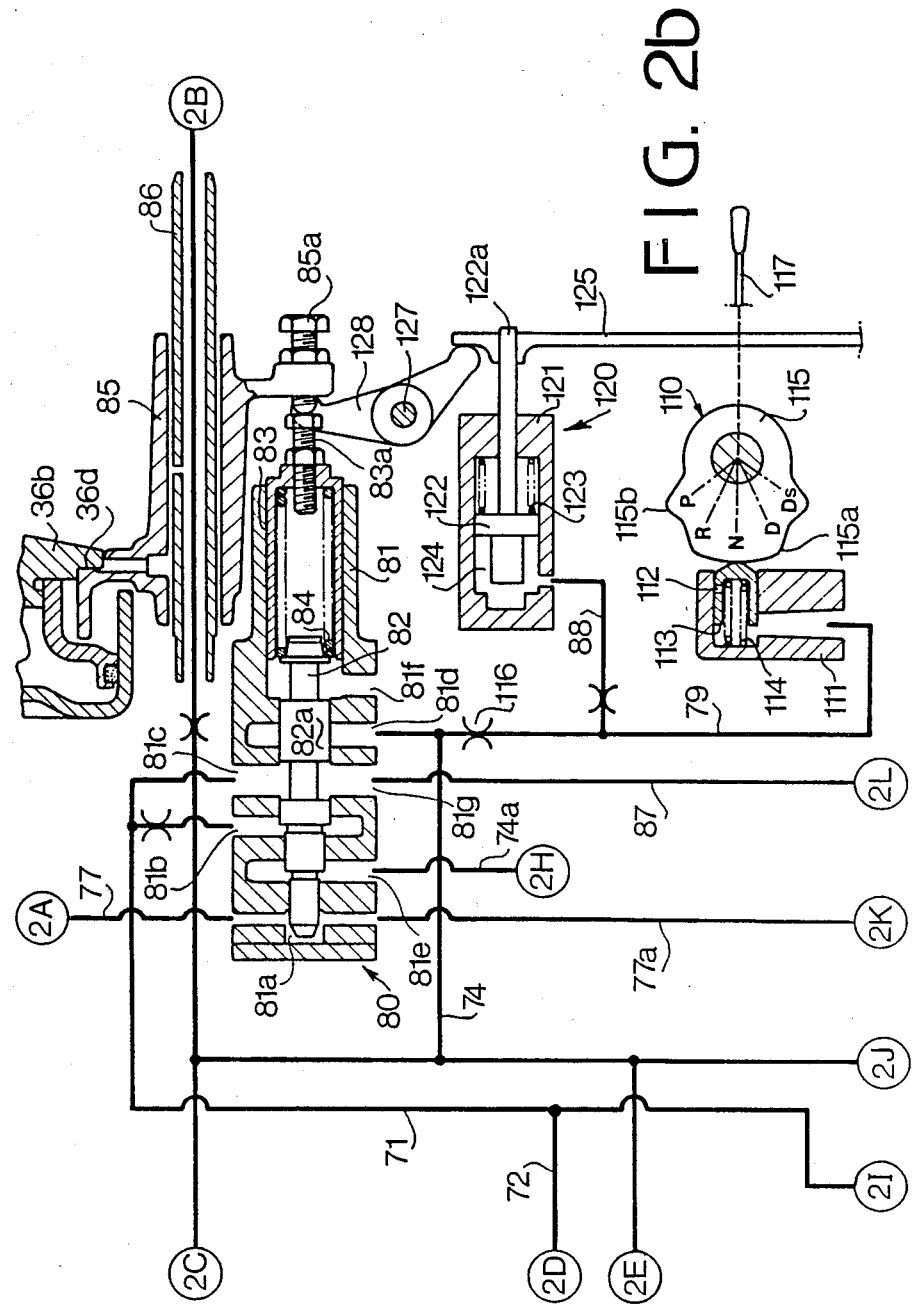

FIGS. 2a to 2c show a hydraulic control circuit according to the present invention. The circuit is provided with a pressure regulator valve 80 and a transmission ratio control valve 90.

The pressure regulator valve 80 comprises a valve body 81, spool 82, and a spring 84 provided between a spring retainer 83 and one end of the spool 82 for urging the spool to the left.

The transmission ratio control valve 90 comprises a valve body 91, spool 92, operating plunger 93, and spring 94 provided between the spool 92 and the plunger 93. Oil in an oil reservoir 70 is supplied to a port 81b of pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 80, a passage 87, ports 91c and 91b of the transmission ratio control valve 90 and a passage 73. Oil flows back from a port 81d of the regulator valve 80 to the inlet of the pump 41 through drain passage 74 and a relief valve 78. A drain port 91d of the transmission ratio control valve 90 is communicated with the oil reservoir 70 through a drain passage 75 and a check valve 108.

In accordance with the present invention, a variable orifice 130, which will later be described in detail, is provided in the passage 75 either upstream or downstream of the check valve 108 so as to control the oil drain.

The drive pulley cylinder 38a has an annular inside groove 38c in which a rotation speed sensor 76 in the form of a pitot tube is provided for measuring the speed of the oil in the groove, that is the speed of the main shaft 20 which is proportional to the engine speed. The pitot pressure produced by the rotation speed sensor 76 is applied to end chambers 81a and 91a of the valves 80 and 90 through passages 77 and 77a.

The port 81d of the pressure regulator valve 80 is communicated with a select position detecting valve 110 upstream of the relief valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to an end of the sensor shoe 85 engages with an end of a bolt 83a secured to the spring retainer 83, and the other end of the sensor shoe 85 engages with an outside periphery 36d of the movable disc 36b. Thus, the position of the movable disc 36b which means the transmission ratio during the operation is transmitted to the spool 82 through the spring 84. At the end of the valve body 81, opposite to the spring 84, pitot pressure is applied to the end chamber 81a, and pump oil pressure is applied to port 81b through the passage 71. A port 81e which is provided between the chamber 81a and the port 81b for preventing the leakage of the oil dependent on the line pressure, is communicated with the oil reservoir 70 through drain passages 74a. The port 81c is communicated with the port 81d through a chamber formed on a land 82a of the spool 82 when the spool is shifted to the right, so that the line pressure can be regulated.

Thus, the spool 82 is applied with the pitot pressure and pump oil pressure so as to be moved in the direction to open the port 81d, whereas the elastic force of the spring 84 corresponding to the transmission ratio detected by the sensor shoe 85 urges the spool 82 in the direction to close the port 81d. Accordingly, high line pressure is generated at the port 81g at a low engine speed with a large transmission ratio. The sensor shoe 85 is moved to the right in FIG. 2b as the transmission ratio decreases, reducing the force of the spring 84 to lower the line pressure. The line pressure is exerted on the belt 34 at a proper force dependent on the transmission ratio so as to cause the belt not to slip on the pulleys.

The transmission ratio control valve 90 further comprises an annular groove 92a formed on the spool 92 so as to communicate the port 91b with 91c or port 91d for supplying or discharging line pressure to or from the drive pulley servo chamber 38b in dependency on the position of the spool 92. A regulator spring 97 is provided between the operating plunger 93 and a retainer 96 securely mounted on a projecting end of a regulator plunger 95 which is slidably provided in an axial cavity 92c in the spool 92. A spring 98 is provided between a flange of the plunger 95 and a retainer 92b of the spool 92. The force of the regulator spring 97 is decided by the projecting extent of the plunger 96 from the spool 92 and the position of the plunger 95 is dependent on the line pressure at the port 91c which is supplied to the inside of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to a chamber 91a through a port 92d. The cavity 93c is supplied with the pitot pressure through a port 91f and a passage 106 having an orifice 105. A spring 107 is provided between an end of the spool 92 and the valve body 91 to adjust the load on the spring 102. An end of the rod 101 engages with a cam 100 which is operatively connected to an accelerator pedal 100a of the vehicle so as to be rotated in dependency on the depression of the pedal 100a.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift.

The select position detecting valve 110 comprises a valve body 111, a valve 113 having a drain aperture 112 which is slidably mounted in the valve body 111, and a spring 114 for urging the valve 113 toward a cam 115 which rotates according to the position of the selector lever 117. The cam 115 has a lobe 115a which corresponds to D, N, R range positions, and lobes 115b formed on the both sides of the lobe 115a, corresponding to P and Ds range positions. At the D, N, R range positions, the lobe 115a pushes the valve 113 in the direction to close the drain aperture 112, so that actuating oil pressure is built up. At the P and Ds range positions, the valve 113 moves outwards to drain the oil from the drain aperture 112, so that the oil pressure in the passage and 79 is reduced. At that time the oil pressure in the passage 74 is prevented from decreasing, because of an orifice 116 provided in the oil passage 79. The oil pressure is applied to an actuator 120.

The actuator 120 comprises a cylinder 121, a piston 122 which is slidably mounted in the cylinder 121, and a spring 123 for urging the piston 122 toward a piston chamber 124 to which actuating oil pressure is applied through a passage 88. Further, a connecting rod 125 is secured to an outer end of a rod 122a of the piston 122 and is engageable with a pin 126 on the rod 101 of the transmission ratio control valve 90. At the P range or Ds range, since no actuating oil pressure exists, piston 122 presses the rod 101 a predetermined stroke by the spring 123 to the left in FIG. 2c, through the rod 125, controlling the transmission zone to the side of high engine revolution. Thus, the releasing of the accelerator pedal 100a at Ds range causes the downshift of the transmission, so that the engine braking is effective. Further, a correction lever 128 rotatably supported by a pin 127 is provided between the sensor shoe 85 and the rod 125, in order to correct the characteristics in the Ds range. One end of the lever 128 engages with the rod 125 only when piston 122 of the actuator 120 moves to the left. Under such a condition, when the transmission is downshifted to shift the disk 36b to the left, the sensor shoe 85 engages with the end of lever 128 to rotate it. Thus, the rod 125 and piston 122 are moved toward the right as the transmission ratio increases, and, at the maximum transmission ratio, the piston 122 is returned to the right end position.

Referring to FIGS. 3a to 3d, the variable orifice 130 is incorporated in the check valve 108. The variable orifice 130 is housed in a frame 60 housing other members of the hydraulic circuit such as the transmission ratio control valve 90 and actuator 120. The frame 60 has a cylindrical chamber 63, a lower opening of which is closed by a separate plate 61 having a hole 61a communicated with the drain passage 75. A port 62 (FIGS. 3a, 3d) which is communicated with the oil reservoir 70 through the drain passage 75 is formed in the wall of the frame 60. A cylindrical rotary valve 131 having a bore 133 therein and a head portion 131a is rotatably mounted in the chamber 63. A ball 108a and a spring 108b for urging the ball 108a to rest on the periphery of the hole 61a in the separate plate 61 are provided in the bore 13 to form the check valve 108. A part of the periphery of the rotary valve 131 is cut away to form an opening 132.

The head portion 131a of the valve 131 projects out of the frame 60. Securely mounted on the head portion 131a is a lever 135 which in turn is connected to a rod 134 pivotally attached to the cam 100. Accordingly, when the accelerator pedal is released, the cam 100 is clockwisely rotated to a position as shown in FIGS. 3a and 3b. Therefore, the rotary valve 131 is rotated so that the opening 132 overlaps the port 62 of the frame 60, as shown in FIG. 3c, thereby increasing the flow rate of the draining oil through the hole 61a, bore 133, opening 132 and the port 62. When the accelerator pedal is depressed, the cam 100 is rotated to push the rod 134 to pivot the lever 135 as shown by a chain line in FIGS. 3a and 3b. Thus, the valve 131 closes the port 62 as shown in FIG. 3d. Accordingly, only a small amount of oil is drained through a gap d (FIG. 3d) between the bottom of rotary valve 131 and the separate plate 61.

Figure 4:
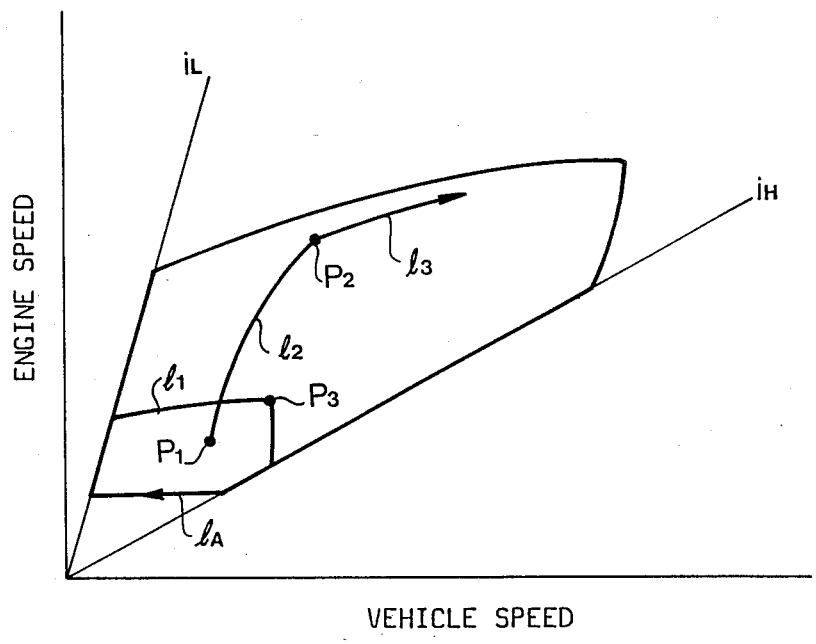
FIG. 4 shows a relationship between vehicle speed and engine speed.

The operation of the system is described hereinafter with reference to FIG. 4. While the vehicle is at a stop, the driven pulley servo chamber 39b is supplied with the line pressure adjusted by the pressure regulator valve 80 through the passages 71, 72, and the drive pulley servo chamber 38b is drained, since the spool 92 is at the left end position by the spring 94. Thus, the driving belt 34 engages with the driven pulley 37 at a maximum running diameter to provide the largest transmission ratio iL (low speed stage) in the graph shown in FIG. 4. During the period, the variable orifice 130 is opened as shown in FIG. 3c.

On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 3 by the selector lever 117. When the accelerator pedal is depressed, the electromagnetic powder clutch 1 is excited by clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the pitot pressure rises, the spool 92 is shifted to the right, so that the line pressure is applied to the servo chamber 38b to move the disc 36b to the right. Thus, the transmission starts to upshift toward the smallest transmission ratio iH.

When the accelerator pedal is completely released at a point $P_3$ while the transmission is being upshifted along a transmission ratio line $l_1$, the transmission ratio control valve 90 operates in accordance with the position of the cam 100 to temporarily upshift the transmission to the smallest transmission ratio iH. When the vehicle is decelerated by braking operation, the transmission is downshifted along the transmission ratio changing line $l_4$. At the same time, the variable orifice 130 is opened in accordance with the releasing of the accelerator pedal, thereby increasing the amount of the drain oil from the servo chamber 38b. Accordingly, the transmission is downshifted at a high rate.

When the kickdown is operated e.g. at a point $P_1$, the cam 100 pushes the plunger 93 thereby rapidly shifting the spool 92 to the left end position to drain the chamber 38b. Accordingly, the transmission starts to downshift, while the engine speed is increased. However, at the same time, the rotary valve 131 of the variable orifice 130 is rotated to close the port 62 in dependency on the rotation of the cam 100 so that the oil is drained only through the gap d. Therefore, the flow rate of drain oil becomes small in spite of the downshift operation of the transmission ratio control valve 90. Thus, the transmission is slowly downshifted along a line $l_2$. At a point $P_2$, the transmission ratio line $l_2$ reaches a transmission ratio changing line $l_3$, which is the transmission ratio changing line for that particular position of the accelerator pedal. After the force of the spring 97 and the pitot pressure in the chamber 91a are balanced, the transmission starts to upshift.

Figure 5A:
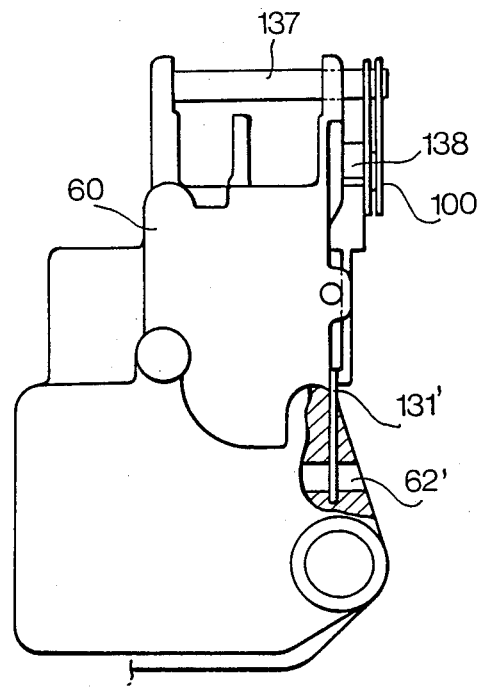
FIGS. 5a and 5b are a plan view and an elevational view of another example of the variable orifice.
Figure 5B:
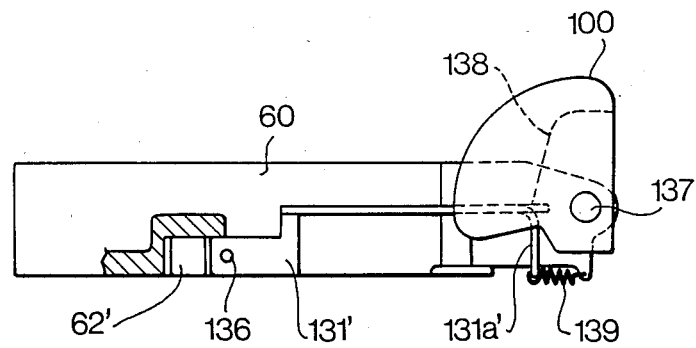

FIGS. 5a and 5b show another example of the variable orifice 130. The variable orifice 130 of the present example is disposed downstream or upstream of the check valve 108. The variable orifice 130 which is housed in the frame 60 comprises a slidable valve 131' having an aperture 136. The slidable valve 131' is disposed to close a port 62' which is formed in the frame 60. The slidable valve 131' is extended toward the cam 100 and bent downwardly to from an L-shaped cam follower portion 131a'. The cam follower portion 131a' is urged by a spring 139 to a cam 138 securely mounted on a camshaft 137 to which the cam 100 is secured.

While the accelerator pedal is released, the slidable valve 131' is at a position shown in FIG. 5b. Thus, the port 62' is completely opened to drain a large amount of oil. As the accelerator pedal is depressed, the cam 100 is rotated, thereby rotating the cam 138 in the same direction. The portion 131a' of the valve 131' is pushed by the cam 138 against the force of the spring 139 so that the valve 131' slides to the left. Thus, the port 62' is gradually closed. At kickdown, the slidable valve 131' further slides to completely close the port 62'. Therefore, a small amount of oil is drained through the aperture 136.

An ordinary fixed orifice 140 may be provided in parallel to the variable orifice 130 as shown in FIG. 2a. The flow rate of drain oil may be changed by selecting an oil passage from a plurality of drain pipes having different calibers.

From the foregoing, it will be understood that in the transmission ratio control system of the present invention. the transmission is quickly downshifted at deceleration and slipping of the belt on the pulleys at reacceleration is prevented. At kickdown, the transmission is slowly downshifted thereby providing smooth driving. The transmission ratio changing speed rate can be controlled without affecting the control at other driving conditions, such as coasting, by a variable orifice having a simple construction provided downstream of the transmission ratio control valve.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An improved control system for a continuously variable transmission for transmitting the power of an automotive engine to driving wheels of a vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a hydraulic circuit having a pump for supplying oil to both the hydraulic cylinders and a drain passage for draining oil in the hydraulic cylinder of the drive pulley, a transmission ratio control valve having a spool for controlling the oil supplied to the cylinder of the drive pulley and the oil drained from the cylinder to change the transmission ratio, wherein the improvement comprises:

means for shifting the spool of the transmission ratio control valve in accordance with depression of an accelerator pedal of the vehicle;

valve means provided in the drain passage for controlling flow rate of drain oil from the cylinder of the drive pulley, the valve means being arranged to change the flow rate of drain oil in accordance with magnitude of the depression of the accelerator pedal so as to provide an optimum rate of downshifting at deceleration of the vehicle and at kickdown of the transmission respectively.

2. The system according to claim 1 wherein the means is a cam operatively connected with the spool and the accelerator pedal and operatively connected to the valve means.

3. The system according to claim 1 wherein the valve means is a variable orifice, the opening degree of which is changed in accordance with the depression of the accelerator pedal.

4. A control system according to claim 3, wherein said variable orifice is downstream of the transmission ratio control valve.

5. The system according to claim 1 wherein the valve means is arranged to reduce the flow rate of drain oil when the magnitude of the depression of the accelerator pedal is large.

6. A control system according to claim 1, wherein said transmission ratio control valve is arranged so as to change an upshifting of the transmission during depression of the accelerator pedal to temporarily upshift the transmission to a smallest transmission ratio of the transmission in response to complete release of the accelerator pedal.

7. A control system according to claim 1, wherein said valve means provides a rapid downshifting rate in accordance with the magnitude of depression of the accelerator pedal during deceleration of the vehicle, and respectively, provides a slow downshifting rate upon the kickdown.

8. A control system according to claim 7, wherein said transmission ratio control valve is arranged so as to change the slow downshifting rate during kickdown to upshifting of the transmission at a transmission ratio changing line for the depression of the accelerator pedal, 9. In a control system for a continuously variable transmission for transmitting power of an automotive engine to driving wheels of a vehicle, the engine having an accelerator pedal, the transmission having a drive pulley with a first hydraulically shiftable disc and a first hydraulic cylinder for operating the first hydraulically shiftable disc, a driven pulley with a second hydraulically shiftable disc and a second hydraulic cylinder for operating the second hydraulically shiftable disc, and a belt engaged with both pulleys, the control system comprising a hydraulic circuit including a pump for supplying oil to both of the hydraulic cylinders and a drain passage for draining oil in the first hydraulic cylinder, and a transmission ratio control valve including a spool for controlling the oil supplied to the first hydraulic cylinder of the drive pulley, and respectively, the oil drained from the first hydraulic cylinder through the drain passage so as to change the transmission ratio of the transmission, the improvement of the control system which comprises means for shifting the spool of the transmission ratio control valve in dependency on depression of the accelerator pedal, and valve means operatively connected with said accelerator pedal for changing flow rate of the oil drained through said drain passage for changing the rate of change of the transmission ratio in dependency on the magnitude of the depression of the accelerator pedal, so as to control the transmission ratio changing rate at downshifting for subsequent rapid acceleration, such as kickdown and at downshifting at deceleration of the vehicle.

* * * * *